United States Patent [19]

Venkatesan

[11] Patent Number: 4,518,934
[45] Date of Patent: May 21, 1985

[54] OPTICAL BISTABLE DEVICE

[75] Inventor: Thirumalai N. C. Venkatesan, Bridgewater, N.J.

[73] Assignee: AT&T Bell Laboratories, Murray Hill, N.J.

[21] Appl. No.: 348,869

[22] Filed: Feb. 16, 1982

[51] Int. Cl.³ .............................. H01S 3/10; G02F 1/28
[52] U.S. Cl. ................................. 332/7.51; 330/4.3; 372/21; 307/425
[58] Field of Search ............... 330/4.3; 332/7.51; 455/611; 272/21, 25, 75; 307/425; 350/356, 359

[56] References Cited

U.S. PATENT DOCUMENTS

| | | | |
|---|---|---|---|
| 3,617,932 | 11/1971 | Paoli et al. | 372/25 |
| 3,829,791 | 8/1974 | Schwartz | 372/21 |
| 4,012,699 | 3/1977 | Gibbs et al. | 330/4.3 |
| 4,071,831 | 1/1978 | Gibbs et al. | 330/4.3 |
| 4,121,167 | 10/1978 | Gibbs et al. | 330/4.3 |
| 4,196,396 | 4/1980 | Smith | 332/7.51 |
| 4,221,472 | 9/1980 | Smith et al. | 372/21 |
| 4,364,014 | 12/1982 | Gray | 330/4.3 |

OTHER PUBLICATIONS

Lai et al., "Optically Induced Bistable . . . Junctions", 1/1/81, pp. 41–44, A. P. L., vol. 38, #1.
"Integrated Bistable Optical Devices", Smith et al., pp. 24–27, A. P. L., vol. 33, #1, 7/1/78.

Primary Examiner—Nelson Moskowitz
Attorney, Agent, or Firm—Volker R. Ulbrich

[57] ABSTRACT

An optically integrated bistable device includes a semiconductor junction Fabry-Perot interferometer cavity and a pair of electrodes for applying a reverse-bias voltage to the junction to increase its light absorption. A capacitor is connected between one electrode and ground for eliminating spurious high-speed signals. A resistor is connected in series with the voltage source between the electrodes to decrease the back-bias in response to photocurrent for a negative feedback.

5 Claims, 3 Drawing Figures

OPTICAL BISTABLE DEVICE

TECHNICAL FIELD

The invention relates to an optical bistable dvice of the type having Fabry-Perot resonator cavity which contains an optical nonlinear absorber material and which is provided with negative feedback means.

BACKGROUND OF THE INVENTION

Optical bistable devices are capable of achieving two different stable optical states, such as transmitting and blocking. They can modulate a reference light source to perform optical switching and logic functions and are useful for optical communications in a variety of ways.

One particularly useful optical bistable device includes semiconductor nonlinear absorber material which is in a Fabry-Perot interferometer cavity configuration. A reference light source beam is incident on an input end face of the cavity. The output transmitted from the other, output end face of the cavity is modulated by a switching light source, which may be incident on the input face together with the reference beam or from some other direction. An increased intensity of light in the cavity saturates the absorber to thereby decrease its absorption coefficient. This permits the light intensity within the cavity to exceed a threshold level sufficient for cavity resonance and a transmitting of the reference beam. A sufficient decrease of the light intensity within the cavity unsaturates the absorber again. This brings the cavity back out of resonance to result in a return to its initial blocking state. The process of switching states has an optical hysteresis, due to the fact that the cavity has a tendency to remain in resonance.

Various optical bistable devices and their mode of operation have been described in a number of patents and publications, such as, for example:

1. "Integrated Bistable Optical Devices", *Appl. Phys. Lett.*, Vol. 33, No. 1, July 1978, by P. W. Smith, I. P. Kaminow, P. J. Maloney, and L. W. Stulz, pp. 24–27;
2. "Polarization-Independent Optical Directional Coupler Switching Using Weighted Coupling", *Optical Communication Conference Proceedings*, Amsterdam, Sept. 17–19, 1979, by R. C. Alferness, pp. 11.4-2–11.4-4;
3. "Optical Modulation by Optical Tuning of a Cavity", *Appl. Phys. Lett.*, Vol. 34, No. 8, April 1979, by H. M. Gibbs, T. N. C. Venkatesan, S. L. McCall, A. Passner, A. C. Gossard, and W. Wiegmann, pp. 511–514;
4. "Optical Bistability and Modulation in Semiconductor Etalons", *Topical Meeting on Integrated and Guided-Wave Optics*, A digest of technical papers presented at the Topical Meeting on Integrating and Guided Wave Optics, Jan. 28–30, 1980, by H. M. Gibbs, S. L. McCall, T. N. C. Venkatesan, A. Passner, A. C. Gossard, and W. Wiegmann, pp. MB5-1–MB5-4;
5. "A Bistable Fabry-Perot Resonator", *Appl. Phys. Lett.*, Vol. 30, No. 6, March 1977, P. W. Smith and E. H. Turner, pp. 280–281;
6. U.S. Pat. No. 4,012,699 issued Mar. 15, 1977 to H. M. Gibbs, S. L. McCall, and T. N. C. Venkatesan; and
7. U.S. Pat. No. 4,121,167 issued Oct. 17, 1978 to H. M. Gibbs, S. L. McCall, and T. N. C. Venkatesan.

It is known to construct a bistable device which uses phase modulation and has no Fabry-Perot cavity, provided there is a negative feedback mechanism. Such an approach is described, for example, in the publication 5 above.

One problem with present approaches to the above-described optical bistable devices is that the nonlinearity of the absorber depends on the photogeneration by the switching light of a relatively large population of conduction band electrons in the absorber. At low temperatures this photogeneration can be achieved with a light of reasonable intensity, particularly using exitons with energies close to the bandgap of the semiconductor. At room temperature, however, the lifetime of the conduction band electrons is so short that a very intense switching light is required in order to generate the conduction band electron density needed for bistability, thus resulting in a device with an unacceptably low sensitivity. The requirements for a low temperature or for a high intensity switching light both lead to relatively complex structures and relatively high power requirements for the bistable device. Therefore, they preferably are avoided for the integrated optics devices for optical communication systems.

SUMMARY OF THE INVENTION

The device of the present invention uses an electric field within a back-biased semiconductor absorber junction in a Fabry-Perot interferometer cavity to obtain nonlinear absorption by the Franz-Keldysh effect, a shift to longer wavelength in the absorption spectrum of a semiconductor when a strong electric field is applied. The photocurrent generated by the light within the absorber is coupled to a feedback resistor having negative feedback which reduces the field. This structure permits a varying of the sensitivity and speed of the device by a regulating of the resistor value. It is possible to obtain a significant gain and a very fast switching response at room temperature. A capacitor may be connected between one portion of the absorber structure and ground for intercepting spurious high speed inputs.

DESCRIPTION OF THE PREFERRED EMBODIMENT

Figure 1:
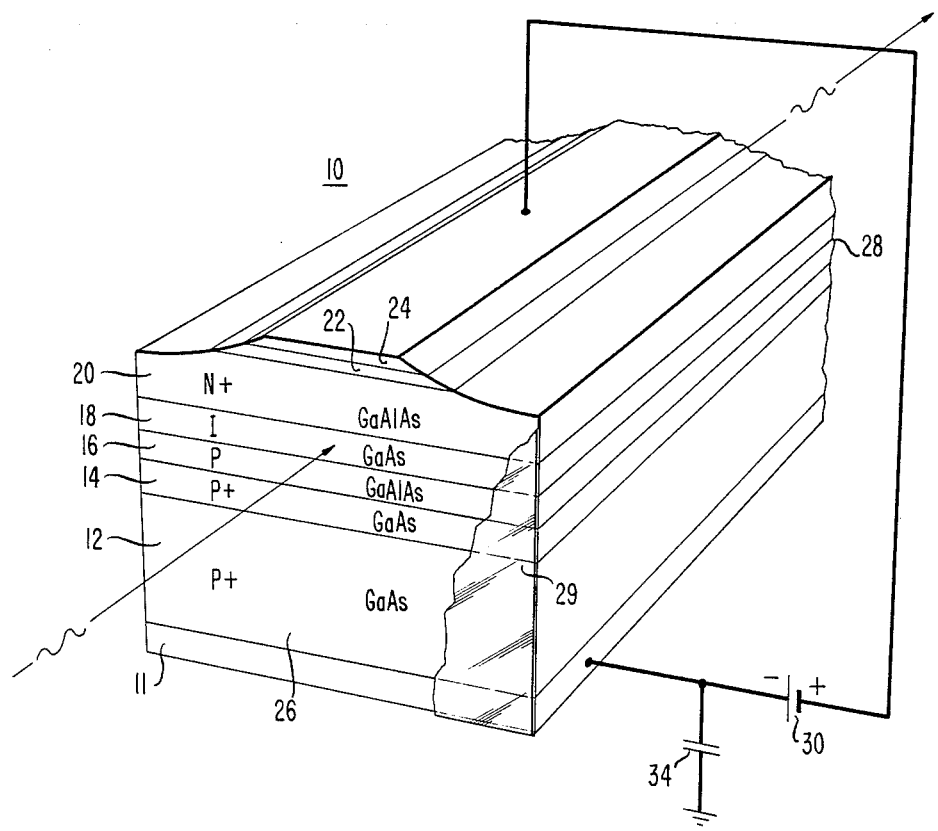
FIG. 1 of the drawings is an elevated perspective of a bistable device in accordance with one example of the invention and shows an integrated multilayer semiconductor Fabry-Perot interferometer structure.

The device 10 of FIG. 1 is an electro-absorption waveguide structure about 100 $\mu$m (micrometers) long and about 10 $\mu$m wide which may be fabricated by molecular beam epitaxy, liquid phase epitaxy, or metal-organic chemical vapor deposition in ways known to those of ordinary skill in the art of semiconductor manufacturing. At the base of the device 10 is a P+ conductivity type doped GaAs (gallium arsenide) substrate layer 12 having a thickness of about 250 $\mu$m (micrometers) and a resistivity of about $10^{-3}$ $\Omega$cm (ohm centimeters). A conductive electrode layer 11 of tin-nickel alloy ohmic contact material with a thickness of about 1 $\mu$m is coated on the bottom surface of the substrate 12 and connected to ground. Over the substrate layer 12 there is a P+ conductivity type doped GaAs buffer layer 14 about 0.5 $\mu$m thick. On the buffer layer 14 is a 0.5 $\mu$m thick layer 16 of P-type conductivity GaAlAs (gallium aluminum arsenide). On the GaAlAs layer 16 is an intrinsic (I) conductivity optically active GaAs layer 18 which is likewise 0.5 $\mu$m thick. On the active layer 18 is a second, 0.5 $\mu$m thick layer 20 of N+ conductivity type doped GaAlAs. This top GaAlAs layer 20 is an etched mesa structure with chamfered edges near the top to restrict electric field lines in a transverse direction. On the GaAlAs layer 20 is first an 8 ohms per square tantalum resistor layer 22 which presents resistance of about $10^5$ $\Omega$ between its major faces. Finally, on the resistance layer 22 is a 1 $\mu$m thick second conductive electrode layer 24 of tin-nickel alloy. The entire structure is cleaved at both ends to form a Fabry-Perot cavity structure with an input face 26 and an output face 28 which are mutually parallel. Both the input face 26 and the output face 28 are coated with a reflective coating 29 to increase the finesse of the active layer 18. A driving voltage source 30 capable of supplying 20-200 volts direct current is connected between the electrodes 11, 24 to generate inside the active layer 18 an electric field in a reverse biased direction between the adjacent layers 16, 20 of differing conductivity types. The structure is a waveguide device, since the GaAlAs layers 16, 20 have an index of refraction greater than the GaAs active layer 18 and therefore reflect light back into the active layer 18, just as would be the case in an optical fiber. A capacitor 34 is connected between the electrode layer 11 and ground reference potential for intercepting and grounding spurious high speed signals.

In the operation of the device 10, an input reference light beam of about 0.9$\mu$ wavelength may be coupled to the input face 26, typically by an optical fiber. An output fiber may be coupled to the output face 28. These may be cemented to the surface in known ways with optical cement to minimize insertion loss.

It is useful to consider first the high output transmit state in which the device 10 transmits most of the reference beam, with the cavity being in its resonant condition. In this state, the light intensity inside the active layer 18 is high. The nonlinear characteristic of the GaAs active layer 18 is such that the absorption coefficient diminishes with increasing light intensity, thus making this a stable state for a given minimum intensity of the reference beam to maintain the resonance. Photogenerated electrical carriers in the GaAs active layer 18 and the adjoining GaAlAs layers 16, 20 will result in electrical current through the resistor 22 and reduce the electrical field inside the device 10, since the voltage from the voltage source 30 is maintained at a constant chosen value. A reduced field shifts the absorption edge of the GaAs material by the known Franz-Keldysh effect to reduce its absorption coefficient. This further establishes the stability of the transmit condition by adding negative feedback.

Figure 2:
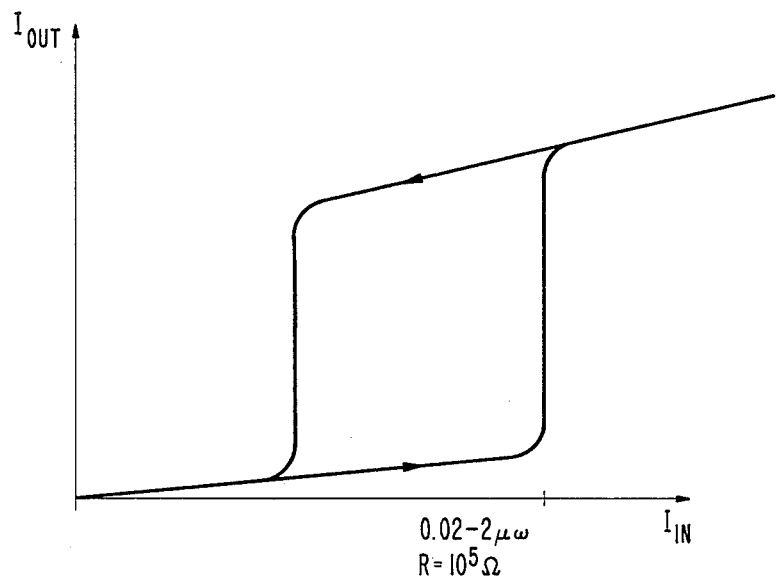
FIG. 2 is a graphical representation showing the approximate optical hysteresis characteristic of the device of FIG. 1.

The graph of FIG. 2 shows in an exaggerated fashion the optical hysteresis of the device 10. The ordinate $I_{OUT}$ represents the output light intensity at the output face 28. The abscissa $I_{IN}$ represents the light intensity coming into the cavity from both the reference light and the triggering light.

Figure 3:
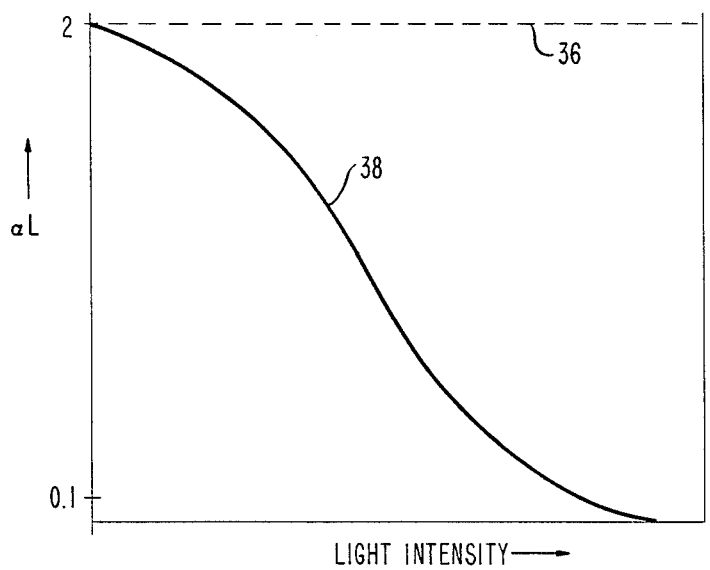
FIG. 3 is a graphical representation of the nonlinear absorption characteristic of the semiconductor material in the cavity of the device of FIG. 1.

FIG. 3 illustrates approximately the relationship between the incident light intensity and the cavity absorption $\alpha L$, which is induced by the external voltage, with and without the effect of the voltage drop in the feedback circuit resistor 22 due to the photocurrent. The dotted line 36 represents the constant $\alpha L$ in the absence of feedback. The curve 38 represents the reduction in $\alpha L$ with the cavity fields decreasing in strength as the Franz-Keldysh effect is lessened by a photocurrent voltage drop in the resistor 22. For the purposes of this illustration, the $\alpha L$ is chosen to have a value of 2 in order to satisfy the necessary conditions for bistability for the given wavelength of reference light.

Switching the device 10 to the low output blocking state is accomplished by reducing the light intensity within the cavity briefly, such as by momentarily interrupting the reference light input beam. The resulting reduced photocurrent leads to an increase in the electric field in the cavity to shift the absorption edge of the active layer 18 toward a higher absorption coefficient. Eventually, this reduces the light intensity in the cavity to a level below the critical threshold level for its resonance. There is additionally a photo-refractive effect in that the reduced light intensity increases the index of refraction of the GaAs layer 18. This also tends to mistune the cavity for the wavelength of the input light. Once the cavity is out of resonance, the intensity of the reference light alone is not sufficient to bring it back into the resonant condition.

In order to bring the device 10 back into the high output transmit condition, the active layer 18 is subjected to a triggering light pulse, which may be either superimposed on the reference light input or be incident from some other direction, such as the side of the device 10. The increased light intensity resulting from the additional triggering light generates a photocurrent in the active layer 18 and through the resistor 22 to reduce the electric field inside the cavity, and therewith the light aborption. The reduced light absorption, coupled with the increased intensity due to the triggering pulse, brings the cavity back into the resonant condition. In this transition there is additionally the photo-refractive effect in the GaAs active layer 18 which reduces the index of refraction to a value compatible with the tuned cavity dimensions.

An important feature of the device 10 is that even at room temperature, depending upon the value of the resistor 22, a triggering light source with a power of only about 0.2 mw (milliwatts) is adequate for switching between the two output intensity levels to thereby modulate the reference beam. This can be done at very high speed, on the order of 10 Mb/s (million bits per second) or faster, depending on the value of resistor 22. It is further possible by choosing the resistor 22 to have a value of about 50,000 $\Omega$, to obtain a gain on the order of about 100 in the output.

GENERAL CONSIDERATIONS

For a given device, the wavelength of the reference light suitable for its operation is chosen so that $$\alpha L(T+\alpha_B L)^{-1} > 8 \tag{1}$$

where
 $\alpha L$ is the absorption coefficient,
 T is the transmission coefficient of the reflective end faces 26, 28, and
 $\alpha_B L$ is the background absorption coefficient.

The wavelength therefore depends upon the energy band edge of the semiconductor material used for the active layer. For GaAs at room temperature, a suitable wavelength is 0.9 μm.

A typical value for the capacitor 34 is 1 picofarad. This yields a response time of about $10^{-7}$ seconds for the device 10 and an optical power of about 200 μW (microwatts), which can be readily supplied by single mode GaAs lasers. With such values, the switching power of the device 10 is about 10 Mb/s (million bits per second). The optical power may be reduced by using a larger value for the resistor 22.

The gain of the device 10 depends on the optical power. It is maximized when the electric field is close to an avalanche condition for the GaAs active layer 18. Typical values of the capacitor 34 and the resistor 22 for lower limit bistable operation of the device 10, that being a holding condition for its bistable state, are about 1 picofarad for the capacitor 34 and, if fast switching is desired, 100 Ω for the resistor 22. This would result in a speed of 0.1 ns (nanoseconds). The minimum optical power for bistability is determined by the number of photons required to generate adequate current in the resistor 22 for causing a voltage drop that will reduce the electroabsorption. For compatibility with existing optical fiber dimensions, the active layer 18 is likely to be between 0.5 and 1 μm thick. This means that the electric field of about $10^5$ volts/cm is needed to obtain the absorption edge shift by the Franz-Keldysh effect would be about 10 volts. The minimum optical power P required for the device to hold its state is the power needed to reduce the absorption to nearly zero, when the optical power P is such that the voltage drop in the resistor 22 is sufficient to prevent Franz-Keldysh absorption in the device. This means that the voltage drop iR in the resistor 22 will be comparable to the voltage drop V across the device 10, where "i" is the photogenerated current after the gain.

If this voltage V is taken to be 10 v, the resistance R of the resistor 22 is $10^5$ Ω, and the conversion efficiency is 0.5 amperes per watt of optical input power, then the holding power P is given by the known relationship $$P = \frac{2V}{RG} = \frac{20v}{(10^5 \Omega) G} = \frac{0.2 \times 10^{-5} \text{ watt}}{G}, \quad (2)$$

where G is the gain of the device. If G is 1, then P is 2.0 μW and the device has a response time of the order of $10^{-7}$ seconds. If the gain were increased, e.g. to 100, then R could be decreased correspondingly to $10^3$ Ω to provide the necessary holding power of 2 μW with a faster response time of $10^{-9}$ seconds. There is a trade-off in terms of speed and sensitivity.

The electric field direction within the active layer 18 is not dependent on the direction of the light. Therefore, any structure providing the electric field in the appropriate direction for back-biasing a semiconductor junction in the absorber could be used to operate the device.

While the device 10 is a layered type structure, other geometries of the cavity, such as a cylindrical one would also be suitable. A useful device can also be constructed without a waveguide configuration. The resistor 22 may also be connected externally to the other structures.

Although the device 10 uses GaAs as the nonlinear absorber material, other semiconductors having a direct energy bandgap in the range permitting photo-absorption by the Franz-Keldysh effect at room temperature for the wavelength of light of the reference beam would be suitable also. Examples of such other materials are GaAlAs (gallium aluminum arsenide), InGaAsP (indium gallium arsenide phosphide), InSb (indium antimonide), InGaSb (indium gallium antimonide), InP (indium phosphide), InAs (indium arsenide), and GaSb (gallium antimonide).

What is claimed is:

1. An optical bistable device of the type comprising:
    means defining a Fabry-Perot interferometer cavity with an input face parallel to and spaced from an output face:
    an optical absorbing medium within said cavity; and
    means including a pair of electrodes for generating an electric field within said medium;
    said device being characterized by:
    at least two contiguous regions of different conductivity type in said medium and oriented between said electrodes so that a reverse-bias electric field results when a driving voltage is applied to said electrodes by a driving voltage source; and
    resistance means connected in series between one of said electrodes and said driving voltage source for generating a back-voltage in response to photo-generated current flow between said electrodes,
    whereby photo-generated current which is generated between said electrodes results in a reduction of the electric field within said medium to provide negative feedback response to a light signal incident on said medium.

2. The device defined in claim 1 and comprising a capacitor connected between one of said electrodes and a reference potential for reducing the response of said device to spurious, high-speed signals.

3. The device defined in claim 2 wherein said medium is a semiconductor material having a direct energy bandgap.

4. The device defined in claim 3 comprising reflective coatings on said input and output faces for increasing the finesse of said Fabry-Perot cavity.

5. The device defined in claim 4 wherein said medium is chosen from the group consisting of GaAs, GaAlAs, InGaAsP, InSb, InGaSb, InP, InAs, and GaSb.

* * * * *